Figure 1:
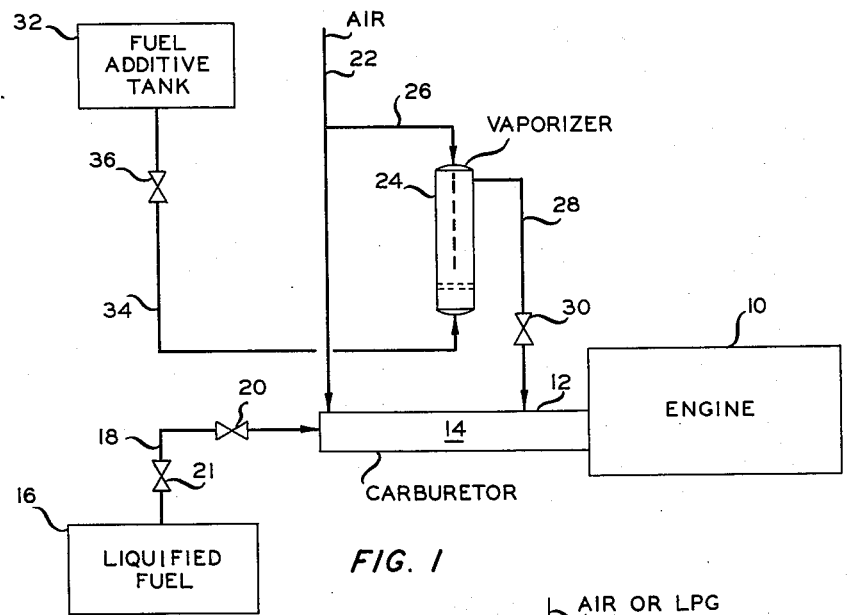

Dec. 20, 1960 P. E. KAHLER 2,965,085
PROCESS AND APPARATUS FOR INTRODUCING
FUEL ADDITIVES WITH LPG FUELS
Filed Dec. 14, 1959

INVENTOR.
P. E. KAHLER
BY Hudson & Young
ATTORNEYS

United States Patent Office 2,965,085
Patented Dec. 20, 1960

2,965,085

PROCESS AND APPARATUS FOR INTRODUCING FUEL ADDITIVES WITH LPG FUELS

Paul E. Kahler, Bartlesville, Okla., assignor to Phillips Petroleum Company, a corporation of Delaware Filed Dec. 14, 1959, Ser. No. 859,229

19 Claims. (Cl. 123—119)

This invention relates to a process and apparatus for metering fuel additives which are normally liquid into a combustible mixture of fuel gas and air to be passed as the feed to a spark-fired internal combustion engine. One aspect of the invention is concerned with a process for forming a stream comprising a combustible mixture of a fuel consisting essentially of fuel gas, air, and a vaporized normally liquid fuel additive.

It has been known to operate spark-fired internal combustion engines, hereinafter referred to simply as engines, with liquefied petroleum gases such as methane, ethane, propane, butane, and mixtures of these gases (hereinafter referred to as LPG). These fuels have normally high octane numbers; however, in many cases where it is desired to operate the engine under severe conditions, engine knock does occur. It would appear obvious to add an antiknock agent, such as a tetraethyllead fluid, to the liquid fuel in order to increase the octane number and therefore minimize engine knock. However, if the liquid fuel containing the lead compound is allowed to vaporize and thereby supply fuel for the engine, there results an uneven distribution of lead in the fuel since the lead compound is much less volatile than the fuel. Further, if the antiknock agent is added as a liquid to the vaporized fuel, it is extremely difficult to meter the antiknock agent with sufficient accuracy.

I have discovered that normally liquid fuel additives, such as lead antiknock agents, can be added to the gaseous hydrocarbon or to the gaseous hydrocarbon-air mixture in a very simple and efficient way. Briefly, I find that part or all of the air supply can be passed over the lead fluid and thereby vaporize and carry with it sufficient lead fluid to cause a marked improvement in engine operation. In an alternate embodiment of this invention, I pass a portion of the gaseous fuel over the lead fluid, admix the resulting mixture with air and thereby provide an improved engine fuel. It is also feasible to pass a mixture of the vaporized LPG and air over the lead fluid to incorporate therein a controlled amount of the additive. This invention is applicable to the metering of any vaporizable fuel additive into a vaporized LPG stream or into air and is particularly advantageous when the liquid additive has a substantially different volatility than the LPG.

Accordingly, it is an object of the invention to provide an improved process for metering a vaporizable fuel additive into a stream of fuel gas, such as a vaporized stream of LPG. Another object is to provide a process for operating a spark-fired internal combustion engine with LPG as a fuel and utilizing a liquid fuel additive to improve the performance of the engine. It is also an object to provide an arrangement of apparatus for metering a fuel additive in gaseous form into a combustible mixture of vaporized LPG and air in the carburetor of an engine being operated on LPG. A further object is to provide an improved process for incorporating tetraethyllead in an LPG fuel to control the concentration of lead in the fuel as it is fed to an engine. Other objects of the invention will become apparent upon consideration of the accompanying disclosure.

In the process of operating a spark-fired engine with LPG fuel, admixture of the liquid fuel additive, such as tetraethyllead, with the gaseous hydrocarbon-air mixture is achieved by passing part or all of the air and/or the hydrocarbon vapor over the lead fluid so as to vaporize the same. While the ensuing discussion relates to liquid tetraethyllead or so-called liquid lead fluids, this is merely illustrative. The vaporized lead fluid, air, and hydrocarbon are mixed in the carburetor so as to achieve a good mixture, and the gaseous mixture is burned in the engine. This method of operation eliminates difficulties which are encountered when operating such engines with gaseous fuels obtained by vaporization of liquid blends of LPG and lead fluid.

Figure 2:
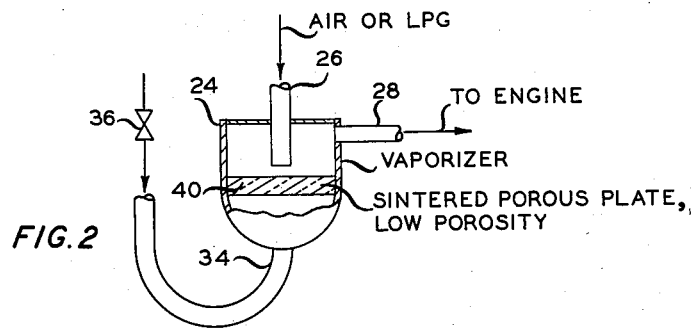
Figures 3, 4:
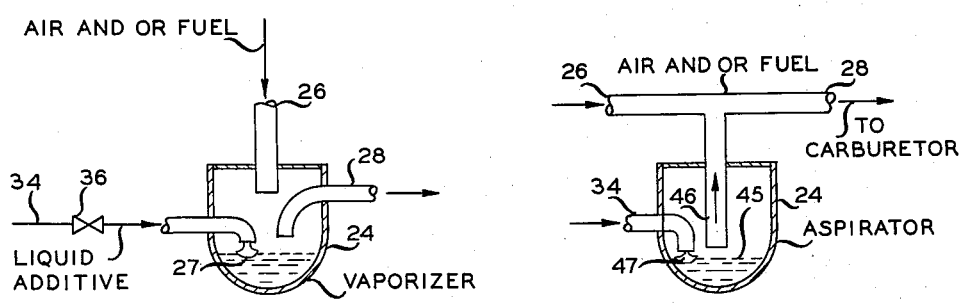

A more complete understanding of the invention may be had by reference to the accompanying schematic drawing of which Figure 1 shows an arrangement of apparatus in accordance with one embodiment of the invention; Figures 2, 3, and 4 show other embodiments of the vaporizer of Figure 1.

Referring to Figure 1, an engine 10 is provided with a carburetor 12 comprising a mixing chamber 14. A fuel tank 16 for LPG is connected with the mixing chamber 14 of the carburetor via line 18. Positioned in line 18 to control flow therethru is a variable flow control valve 20 and a pressure regulator 21 which facilitates flow control by valve 20. Valve 20 functions as the throttle on the fuel fed to the engine and may be positioned within carburetor 14. An air line 22 also connects with the mixing chamber 14 of the carburetor. A vaporizer 24 is connected with air line 22 by means of conduit 26 leading to a lower level in the vaporizer. A second conduit 28 connects with the upper end of vaporizer 24 and leads into mixing chamber 14 of carburetor 12. A valve 30 positioned in conduit 28 can be utilized to control the proportion of air flowing thru the vaporizer and hence the amount of fuel additive vaporized. A supply vessel 32 for fuel additive is connected with the lower section of vaporizer 24 by supply line 34 containing a flow control valve 36.

In operation with the arrangement of apparatus shown in Figure 1, vaporized LPG flows from tank 16 upon opening of valve 20 and air is drawn into mixing chamber 14 by the suction created by operation of engine 10. A portion of the air supply for the carburetor is passed thru vaporizer 24 by controlling the opening of valve 30. The air leaving the vaporizer and passing to the mixing chamber thru line 28 carries with it vaporized fuel additive which is admixed with the air-hydrocarbon mixture in chamber 14 to form the combustible mixture supplied to the engine 10. Valves 20 and 30 can be manually or automatically controlled. Valve 36 may be operated simply in open position and as a shut-off valve when the engine is not in operation; or it may be opened a controlled amount in proportion to the opening of valve 20, in which case valve 30 is maintained in a fixed open or partially open position to allow constant flow rate of air thru the vaporizer.

In the vaporizer of Figure 2, a sintered porous partition or plate 40 of low porosity is positioned in vaporizer 24. This plate may be fabricated of materials such as Alundum (alpha-alumina) or other porous ceramic material, or spongy porous metal formed by powdered metallurgy or in the manner of preparing Raney nickel catalysts. This porous partition functions to allow liquid fuel additive to flow into the vaporizing section of the vaporizer at a slow rate to provide a constant composition of the fuel additive for vaporization. The rate of flow of additive thru partition 40 is also varied by varying the opening of valve 36.

In Figure 3, conduit 26 terminates in the upper section of the vaporizer and conduit 28 extends down into a lower section of the vaporizer so as to take off fuel additive from adjacent the level of the liquid in the vaporizer. A float 27 limits the liquid level in vaporizer 24. When this embodiment of the invention is substituted for the vaporizer of Figure 1, valve 36 is fully open and valve 30 is opened in proportion to the load on the motor or in proportion to the fuel metered to the carburetor, i.e, in accordance with the opening of valve 20.

The embodiment of the invention illustrated in Figure 4 is a true aspirator in which line 26 passes directly into line 28 and a conduit 46 forms a T with lines 26 and 28, extending into aspirator 24. In operation of this aspirator a fixed liquid level 45 is maintained therein below the lower end of conduit 46 by a float 47.

The most commonly employed fuel additive is tetraethyllead. When utilizing this fluid, the amount introduced into the fuel mixture is varied from a trace, such as 0.01 cc. per gallon of liquid fuel to several cubic centimeters per gallon. Generally, between 0.3 and 6 cc. per gallon are employed. The amount of additive metered is controlled by varying the amount or rate of flow thru valve 30 in response to the opening of valve 20 as explained heretofor.

Tetraethyllead is most commonly used in conjunction with one or more alkylene dihalides, generally ethylene dibromide and/or ethylene dichloride. Thus a so-called motor mixture contains two atoms of chlorine as ethylene dichloride and one atom of bromine as ethylene dibromide for each mole of tetraethyllead. A conventional aviation mixture or fluid contains two atoms of bromine as ethylene dibromide for each mole of tetraethyllead. In each mixture the lead is present as tetraethyllead. Usually a small amount of dye is added so as to give the mixture a characteristic color. Such lead fluids can be employed alone or in admixture with suitable diluents. Normally liquid hydrocarbons such as the alkanes, the cycloalkanes and the aromatics can be employed. Examples of these compounds are the hexanes, heptanes, octanes, decanes, cyclohexane, methylcyclohexane, toluene, xylene, etc. The amount of the hydrocarbon diluent which is employed is not critical but generally it is employed in amounts less than 25 times the volume of the lead fluid (tetroethyllead plus alkylene halide).

The composition in weight percent of the above described motor and aviation mixes is summarized below:

| Constituent | Weight percent in— | |
| --- | --- | --- |
| | Motor Mix | Aviation Mix |
| Tetraethyllead | 61.48 | 61.41 |
| Ethylene dichloride | 18.81 | |
| Ethylene dibromide | 17.86 | 35.68 |
| Dye | 0.050 | 0.026 |
| Kerosine and impurities | 1.80 | 2.88 |

A dilute solution of the aviation mix is also employed. This dilute aviation mix is a mixture of 16.46 parts by volume of the aviation mix and 83.54 parts by volume of a solvent. The solvent consists of 30 percent by volume n-heptane and 70 percent by volume xylene.

While the above is a description of the invention as applied to lead fluids, it will be understood that my invention is not to be unduly limited. Those skilled in the art, upon reading this disclosure, will realize that modifications in equipment can be made. Further, two or more fuel additives may be dispensed by having two or more dispensers in series or in parallel. The additives employed need not be restricted to lead fluids. For example, I can employ other modifiers such as the organic phosphorus compounds typified by tricresyl phosphate and triphenyl phosphate.

In order to illustrate the invention a run was made using a single cylinder CFR engine. The equipment arrangement was basically that shown in Figure 1. The engine was operated at 900 r.p.m. with a 20 degree spark advance. Liquefied propane was vaporized and metered to the engine at a gas flow rate of about 0.196 cubic feet per minute (corrected to 60° F. and 30 inches mercury pressure). The air to fuel ratio by weight was between 14.3 and 14.5.

The lead fluid employed was a commercial product comprising

| | ml. |
| --- | --- |
| 70:30 xylene:heptane mixture by volume | 866 |
| Aviation fluid* | 170 |

*Equimolar mixture of $Pb(C_2H_5)_4$ and $BrCH_2CH_2Br$.

so that each cubic centimeter of the solution contained 0.106 cc. of tetraethyllead. Three cubic centimeters of this lead fluid were placed in the vaporized. By control of the rate at which the air was passed thru the vaporizer, the rate of vaporization of the lead fluid, when employed, was about 0.0333 cc. of lead fluid per minute, equivalent to about 0.0035 cc. of tetraethyllead per minute. The air admitted to the carburetor was heated to 100° F., and the temperature of the fuel-air mixture at the intake to the engine was about 300° F.

For the above-described conditions, the amount of tetraethyllead employed amounts to 0.65 cc. per gallon of liquid propane. The octane number of the propane was increased from 100 to 110 by use of the lead fluid in the process as described. Thus, small amounts of lead fluid effect a significant increase in the octane number.

While the invention as described is advantageous in the operation of engines using LPG, it is also useful in metering normally liquid fuel additives into a gaseous fuel stream from any source, such as in the operation of a stationary engine with natural gas from a conventional gas line.

The carburetor of LPG is well developed in the art. Suitable equipment for feeding LPG to an LPG carburetor is disclosed in Educational Bulletin No. 1, Carburetion and Vaporization Equipment, published by American Liquid Gas Corporation, 1109 Sante Fe Ave., Los Angeles, California.

Certain modifications of the invention will become apparent to those skilled in the art and the illustrative details disclosed are not to be construed as imposing unnecessary limitations on the invention.

I claim:

1. A process for forming a stream of a combustible gaseous mixture consisting essentially of a normally gaseous fuel, a normally liquid fuel additive, and $O_2$-containing gas which comprises vaporizing said liquid fuel additive into a stream of at least a portion of at least one of the fuel gas and $O_2$-containing gas components of said mixture; and forming a combustible stream of said $O_2$-containing gas and said fuel gas, including the stream of additive-bearing gas.

2. The process of claim 1 wherein said additive comprises tetraethyllead.

3. The process of claim 1 wherein said additive comprises a solution of tetraethyllead and alkylene dihalide.

4. The process of claim 1 wherein said additive is admixed with a normally liquid hydrocarbon diluent.

5. The process of claim 1 wherein said additive is vaporized into a stream of said $O_2$-containing gas.

6. The process of claim 1 wherein said additive is vaporized into a stream of fuel gas.

7. The process of claim 1 wherein said fuel is vaporized LPG.

8. A process for operating a spark-fired internal combustion engine which comprises mixing a fuel gas with air to form a combustible mixture; vaporizing a volatile normally liquid fuel additive into a gaseous stream of at least a portion of at least one of the components of said mixture before the mixing step to incorporate in said mixture a small but effective amount of said fuel additive; delivering a stream of said mixture to said engine; and firing said stream in said engine to operate same.

9. The process of claim 8 wherein said additive comprises tetraethyllead in a concentration in the range of 0.01 to 6 cc. per gallon of said fuel.

10. The process of claim 9 wherein said tetraethyllead is admixed with an alkylene dihalide.

11. The process of claim 9 wherein said tetraethyllead is admixed with a normally liquid hydrocarbon solvent.

12. The process of claim 8 wherein said fuel additive is vaporized into a stream of air.

13. The process of claim 8 wherein said fuel additive is vaporized into a stream of said fuel.

14. Apparatus comprising in combination a fuel tank for liquefied petroleum gas; a spark-fired internal combustion engine; a carburetor having a mixing chamber connected by conduit with intake ports in said engine; a valved fuel line connecting said tank with said mixing chamber; an air line connecting with said mixing chamber; a fuel additive vaporizer connected by a first conduit with said mixing chamber and by a second conduit with one of said fuel line and said air line for vaporizing a liquid fuel additive into one of the fuel and air.

15. The apparatus of claim 14 wherein said vaporizer is connected with said air line.

16. The apparatus of claim 14 wherein said vaporizer is connected with said fuel line.

17. The apparatus of claim 14 wherein said vaporizer comprises an aspirator.

18. The apparatus of claim 14 including a supply vessel for liquid additive positioned at a level above said vaporizer and connected therewith by a supply line; and a valve in said supply for controlling the flow rate of additive.

19. The apparatus of claim 14 including a supply vessel for liquid additive positioned at a level above said vaporizer and connected therewith by conduit; and a transverse finely porous partition in said vaporizer above the fuel inlet therein.

No references cited.